(12) United States Patent
Ko

(10) Patent No.: US 7,221,565 B2
(45) Date of Patent: May 22, 2007

(54) GROUNDING PART OF HARD DISK AGAINST EMI AND SHOCK

(75) Inventor: Yu-Shi Ko, Taipei (TW)

(73) Assignee: Inventec Corporation, Taipei (TW)

( * ) Notice: Subject to any disclaimer, the term of this patent is extended or adjusted under 35 U.S.C. 154(b) by 158 days.

(21) Appl. No.: 11/198,187

(22) Filed: Aug. 8, 2005

(65) Prior Publication Data

US 2007/0030639 A1    Feb. 8, 2007

(51) Int. Cl.
*G06F 1/16* (2006.01)
(52) U.S. Cl. .................. 361/685; 361/753; 361/816; 361/818; 174/5 SG; 174/7; 312/223.1; 211/41.17
(58) Field of Classification Search ........ 361/683–685, 361/721–728, 753, 759, 788, 801, 802, 816, 361/798, 818; 312/223.1, 223.2, 223.3, 319.1, 312/319.2, 333.1; 211/41.17; 174/5 SG, 174/7, 35 R, 57, 58; 360/137 D, 97.01, 98.01; 248/60, 581, 609, 611, 346.03, 346.04
See application file for complete search history.

(56) References Cited

U.S. PATENT DOCUMENTS

| | | | |
|---|---|---|---|
| 6,421,236 B1* | 7/2002 | Montoya et al. ............ 361/685 |
| 6,469,889 B1* | 10/2002 | Gan ............................ 361/685 |
| 6,876,547 B2* | 4/2005 | McAlister .................... 361/685 |
| 6,879,495 B2* | 4/2005 | Jiang .......................... 361/818 |
| 7,148,418 B2* | 12/2006 | Ku et al. ..................... 361/752 |

* cited by examiner

*Primary Examiner*—Michael Datskovskiy
(74) *Attorney, Agent, or Firm*—Bacon & Thomas, PLLC

(57) ABSTRACT

The present invention is to provide a grounding part of hard disk (HDD) against EMI and shock, which includes a HDD body and two conducting frames, wherein the two conducting frames are composed of a narrow vertical plane and two parallel planes extending along two corresponding sides of the vertical planes to form a U-type conducting frame with an opening, a plurality of elastic projections are disposed on the two parallel planes of the two conducting frames, and the openings of the two frames just accommodate the two corresponding sides of the HDD body. When the HDD body and the two conducting frames is installed in a containing room of an electronic device (e.g. notebook computer), the requirements of shock protection, EMI protection and grounding for the HDD body is achieved by virtue of the compression of those elastic projections.

5 Claims, 4 Drawing Sheets

GROUNDING PART OF HARD DISK AGAINST EMI AND SHOCK

FIELD OF THE INVENTION

The present invention relates to a ground part of hard disk (HDD), more particularly to a ground part disposed at external edge of a HDD body which achieves the requirements of shock protection, EMI protection and grounding for the HDD body as well as production cost reduction while the HDD body being installed in a containing room in an electronic device (e.g. notebook computer).

BACKGROUND OF THE INVENTION

Nowadays, the increasingly progressive development of network and communication technologies bring about the diversified portable devices, such as digital electronic products like notebook computer and the like, featuring price-effectiveness, compactness and portability in the daily life and work. In addition to solving the demand of wireless communication of ordinary people, other entertainments and data management requirements, e.g. various digital games and databases, are also available, making the use of the portable devices become commonplace particularly in the busy metropolitan life style. Moreover, keeping abreast with the industrial readiness and more and more added peripheral functions, the functions possessed by the current portable devices already surpass the earlier basic model by a substantial extent and the added peripheral functions are essential now, accounting for a major trend under development.

Furthermore, owing to the current notebook computer being more and more light and thin, the conventional 2.5" hard disk (HDD) is apparently hard to meet the light and thin requirements of the notebook computer. As such, the 1.8" HDD is applied instead accordingly and has become a new trend. However, some notebook computer manufacturers, such as TOSHIBA, produce the 1.8" HDD having a design with no screw hole on the HDD body. Therefore, the fixing means of the HDD body is extremely difficult.

Most of the notebook computer manufacturers today employ a rubber and a bracket means to fix the HDD body. Although the application of the rubber ensures the shock prevention effect of the HDD body, the HDD body fails to be grounded due to the non-conducting nature itself. Hence, certain construction materials must be added to secure the grounding effect, and this certainly introduces a hike on the production cost of the notebook computer manufacturer relatively.

The mentioned shock prevention and grounding issues are the test criteria necessarily conducted on the HDD body for the present notebook computer manufacturer to install the HDD body upon integrating the computer and to secure the HDD body in conformity of a test standard. Besides, the resulting electromagnetic interfering (EMI) out of the operation of the HDD operation also impacts on the notebook computer and jeopardizes the health of human body. In view of this, many countries have already requested to pass the electromagnetic compatibility (EMC) before the actual sales to the market.

The so-called EMI means an electromagnetic noise generated during the operation of instruments and devices containing electronic and electrical components or the useless signal of device interfering with other devices by way of radiation or transmission to result in malfunction or distortion of other devices. As a result, it becomes an issue as to if the HDD body can be effectively free from EMI (EMI). In that sense, products with superior design against EMI thus have more values to be distributed and marketed globally.

Please refer to FIG. 1 below showing the schematic diagram of the conventional HDD body using the rubber sheath:

In FIG. 1 a containing room 11 concavely disposed on one side of case 10 of a notebook computer is conspicuously found and the containing room is just enough for the HDD body 12. The four side edges of the HDD body 12 are covered with a rubber 13 so as to ensure the shock protection effect of the HDD body 12 by virtue of the elastic characteristics of the rubber 13. However, as the rubber 13 is a nonconductor, it fails to achieve the grounding effect for the HDD body 12. Consequently, it is necessary to dispose a conducting part (not shown) on the inner surface of a cover plate (not shown) of the containing room 11 so as to attain the grounding effect by means of the conducting part in contact with another conducting part 121 on the surface of the HDD body 12.

Whereas, in addition to a required mold causing higher cost, the mentioned approach employs costly materials and certain structural design must be added in terms of the grounding and EMI protection. All these make the effective cost reduction out of reach. Furthermore, the requirements for shock protection, EMI protection and grounding have been demanded more rigorously due to the readiness of the industry. Aside from the constant technical upgrade, the cost-down factor is on top of the list when notebook computer manufacturer takes into account a new design.

In summary, how to be unique in the rising homogeneity among the electronic devices sheds the light on the wining measure to the manufacturers. As such, how to design a product capable of overcoming the mentioned drawbacks and enhancing the competitive edge of manufacturers is an immediate subject for manufacturers to tackle.

SUMMARY OF THE INVENTION

In view of the forgoing description, the conventional 1.8" HDD having the design free of screw hole must be added some structural designs so as to achieve the test result in conformity of the requirements of shock protection, EMI protection and grounding. Accordingly, in addition to a mold additionally required to reflect a hike on the cost to the notebook computer manufacturer, the materials are also prone to be expensive. Therefore, how to accommodate a HDD body featured with shock protection, EMI protection and grounding together with the low cost concern is actually the goal of the present invention. After sensing such consideration, the inventor persistently endeavors to research and test in an attempt to effectively resolve the existing problems and meet the actual demand of the market. A grounding part of hard disk against EMI and shock of the present invention is finally developed, and hopefully the ingenious conception thereof has its contribution to the society.

The present invention targets at effectively resolving the drawbacks of the conventional 1.8" HDD, which require certain additional structural design for attaining the test effect in conformity of the requirements of shock prevention, EMI protection and grounding and inevitably make the production cost on the rise. The technical solution to the shortcoming includes a HDD body and two conducting frames, wherein the two conducting frames are composed of a narrow vertical plane and two parallel planes extending along two corresponding sides of the vertical planes to form a U-type conducting frame with an opening, a plurality of elastic projections are disposed on the two parallel planes of the two conducting frames, and the openings of the two frames just accommodate the two corresponding sides of the HDD body. When placing the HDD body and the two conducting frames between an upper case and a cover of a containing room in an electronic device (e.g. notebook computer), the requirements of shock protection, EMI protection and grounding for the HDD body as well as production cost reduction can be achieved by virtue of the compression of those elastic projections.

Moreover, a positioning plate is also included and the two corresponding ends of the positioning plate are inserted just in one end of the two conducting frames. Another ends of the two conducting frame are disposed a screwing hole respectively, and the two screwing holes are fastened inside a lower case of the containing room by means of a screwing element (e.g. screw) so as to hold the two corresponding sides of the HDD body with the two conducting frames more firmly.

The above and other objects, features and advantages of the present invention will become apparent from the following detailed description taken with the accompanying drawings.

DETAILED DESCRIPTION OF THE PREFERRED EMBODIMENTS

Figure 1:
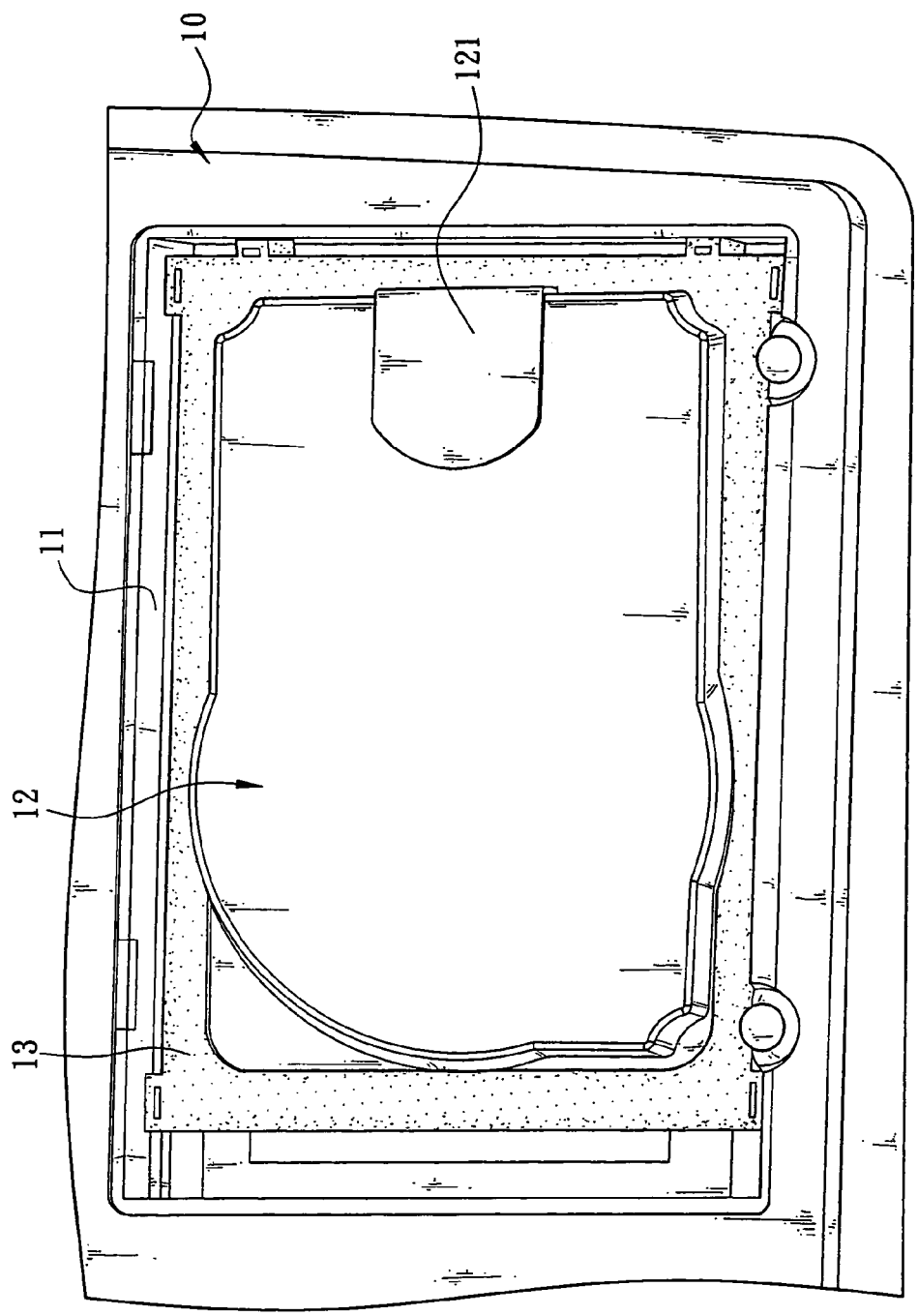
FIG. 1 is the schematic view of conventional HDD sheathed with rubber and placed in the containing room of notebook computer.
Figure 2:
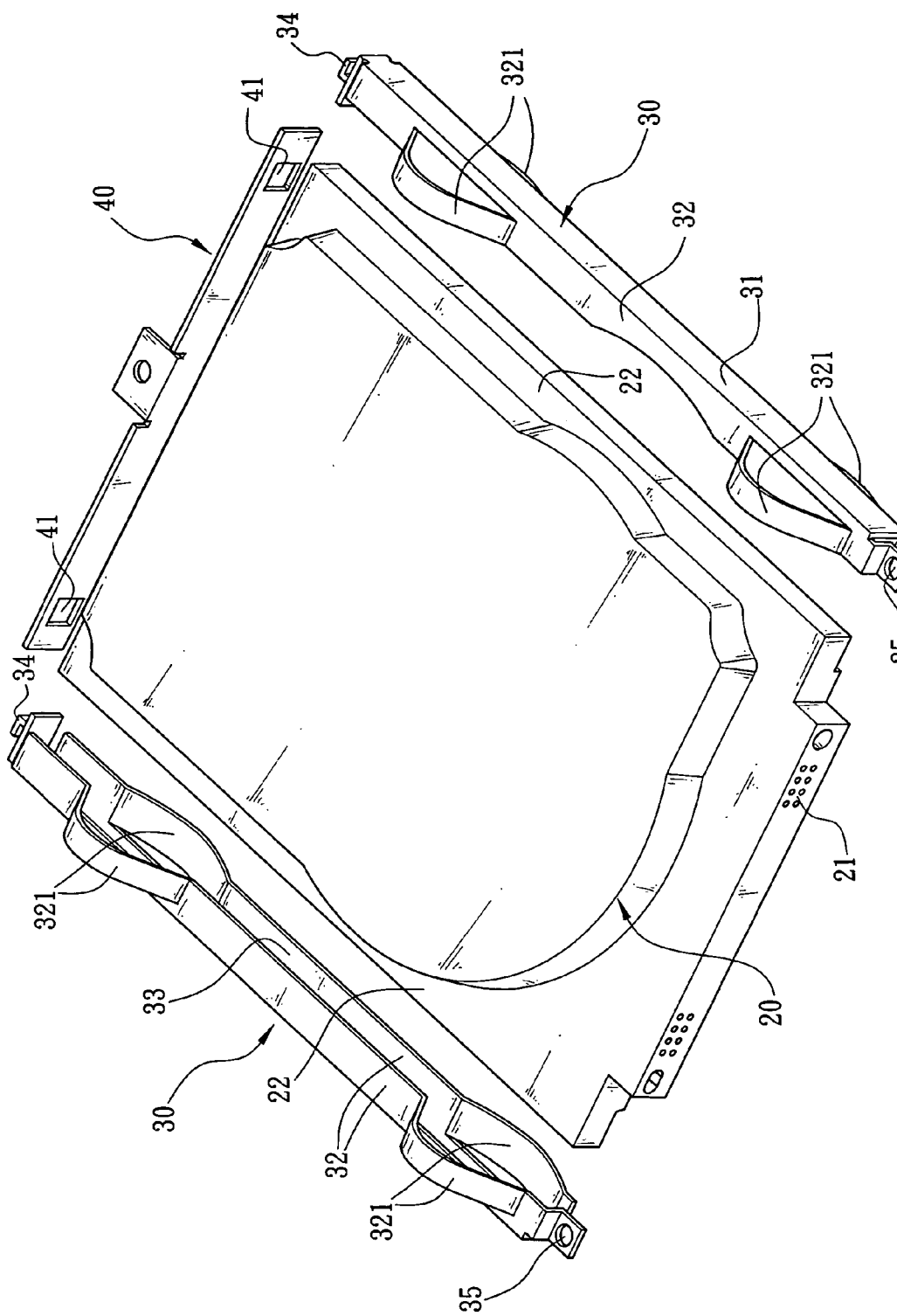
FIG. 2 is the exploded view of the present invention.
Figure 3:
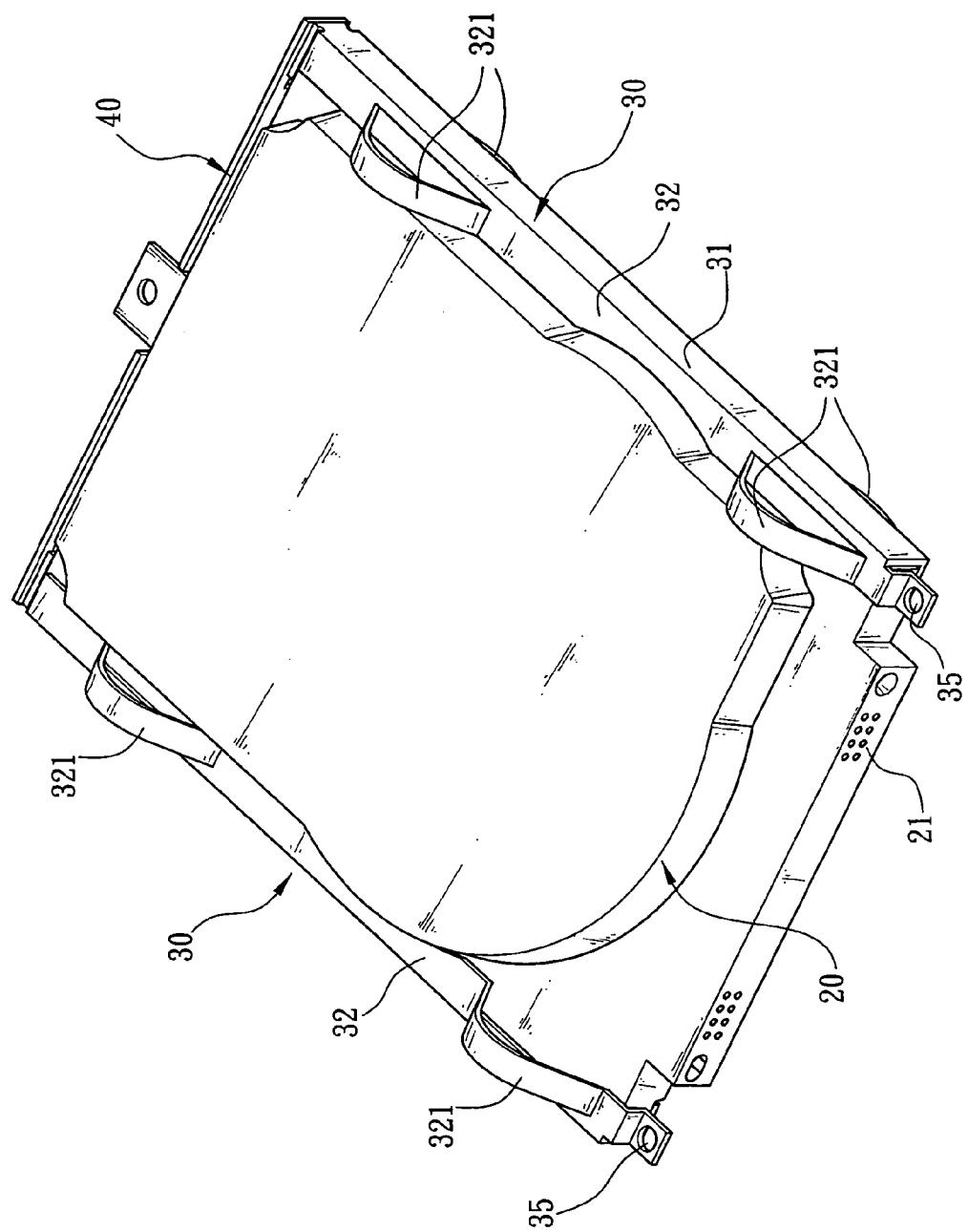
FIG. 3 is the assembly view of the present invention.

The present invention relates to a "grounding part of hard disk against EMI and shock". Please refer to FIGS. 2 and 3 showing a HDD body 20, which is a 1.8" hard disk in the embodiment. One side of the HDD body 20 is disposed at least one electrical connection part 21 used to connect with an external connection line (not shown). There are two other conducting frames 30 composed of a narrow vertical plane 31 and two parallel planes 32 extending along two corresponding sides of the vertical planes in formation of a U-type conducting frame 30 with an opening 33 (as shown in FIG. 2). The two parallel planes of the two conducting frames are disposed a plurality of elastic projections 321 so that the opening 33 of the two conducting frames 30 can just accommodate the two corresponding sides 22 of the HDD body 20 to form a tight mechanical matching.

Please further refer to FIGS. 2 and 3 showing a positioning plate 40, in which the two corresponding ends of the positioning plate 40 are inserted in one end of the two conducting frames 30. Another ends of the two conducting frame 30 are disposed a screwing hole 35 respectively and the two screwing holes 35 are fastened by means of a screwing element 60 (e.g. screw) so as to hold the two corresponding sides 22 of the HDD body 20 with the two conducting frames more firmly. The insertion means for mutual engagement between the positioning plate 40 and the two conducting frames 30 employs an insertion hole 41 disposed on each of the two corresponding ends of the positioning plate 40 and a fastener 34 (as shown in FIG. 2) disposed over one end of each of the two corresponding conducting frames 30.

Besides, those projections 321 in the embodiment are disposed in the front end and the rear end of the two conducting frames 30 and the form of the projection includes but not limited to an arc clip. Regardless of the form, the projection that is subject to flexible adaptation or modification shall all be covered in the scope of the present invention.

Figure 4:
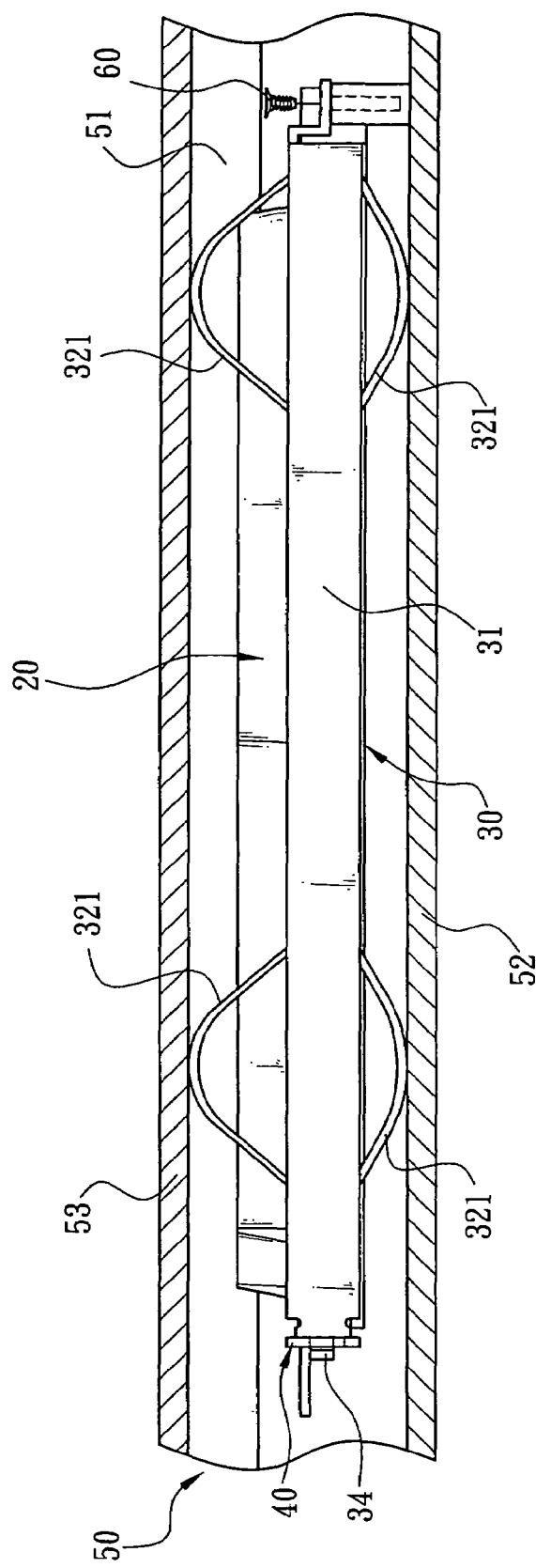
FIG. 4 is the cross section view of the assembly of the present invention being placed in the containing room of notebook computer.

Given the mentioned parts, the mechanism involved is more understandable. While assembling, firstly, the opening 33 (as shown in FIG. 2) faces toward the two corresponding sides 22 of the HDD body 20 and holds them closely. Secondly, the positioning plate 40 is mutually engaged with the two fasteners 34 of the two conducting frames by means of the insertion hole 41 on the two corresponding ends so as to form the integral parts as shown in FIG. 3. As a consequence, please refer to FIG. 4 to place the integral parts in a containing room 51 concavely disposed on one face of an electronic device 50 (e.g. notebook computer). Another ends of the mentioned two conducting frames 30 are fastened to a lower case 52 of the containing room 51 with the screwing element 60 (such as screw). Meanwhile, those elastic projections 321 on the lower part of the two conducting will be compressed to further achieve the purpose of shock protection, EMI protection and grounding. Lastly, a cover 53 for the containing room 51 is covered thereon. At the moment, those elastic projections 321 on the upper part of the two conducting frames 30 will be compressed to further achieve the purpose of shock protection, EMI protection and grounding.

As such, the technical design capable of directly fixing the grounding part on the outer side of the HDD body 20, not only effectively enabling the HDD body 20 in compliance with the test result of the requirements of shock protection, EMI protection and grounding, but achieving the benefit of cost-down in production with the design of the grounding part. The drawback in having higher cost and high material cost due to a mold conventionally required can be effectively resolved. In the meantime, the conventional method must add a few structural designs so as to conform to the requirement in regard to grounding and EMI protection. The present invention provides the advantages of simple construction and lower cost, adding that it also uplifts the competitive edge of such line of products. Therefore, the design of the present invention is progressive indeed.

While the invention herein disclosed has been described by means of specific embodiments, numerous modifications and variations could be made thereto by those skilled in the art without departing from the scope and spirit of the invention set forth in the claims.

What is claimed is:

1. A hard disk (HDD) grounding part for electromagnetic interference (EMI) protection and shock protection, comprising:

a HDD body; and two conducting frames, comprising a narrow vertical plane and two parallel planes, wherein said parallel planes extend along two corresponding sides of said vertical plane to form a U-type conducting frame with an opening respectively, a plurality of elastic projections are disposed on said parallel planes of said conducting frames, and corresponding sides of said HDD body are received in said opening of said conducting frames so as to be compressed in an upper case and a cover of a containing room of an electronic device with said projections.

2. The HDD grounding part for EMI protection and shock protection of claim 1 further comprising a positioning plate, wherein two corresponding ends of said positioning plate are inserted in one end of said conducting frames, another ends of said conducting frames are disposed a screwing hole respectively, and said screwing holes are fastened inside said upper case of said containing room with a screwing element respectively.

3. The HDD grounding part for EMI protection and shock protection of claim 2, wherein said corresponding ends of said positioning plate are disposed an insertion hole respectively, and one ends of said conducting frames are disposed a fastener respectively for mutual engagement.

4. The HDD grounding part for EMI protection and shock protection of claim 1, wherein said projections are disposed in the front end and rear end of said conducting frames.

5. The HDD grounding part for EMI protection and shock protection of claim 4, wherein said projections include the form of an arc clip.

* * * * *